(12) United States Patent
Koning et al.

(10) Patent No.: US 7,962,609 B2
(45) Date of Patent: *Jun. 14, 2011

(54) ADAPTIVE STORAGE BLOCK DATA DISTRIBUTION

(75) Inventors: G. Paul Koning, Brookline, NH (US); Peter C. Hayden, Mount Vernon, NH (US); Paula Long, Hollis, NH (US)

(73) Assignee: Dell Products, L.P., Round Rock, TX (US)

( * ) Notice: Subject to any disclaimer, the term of this patent is extended or adjusted under 35 U.S.C. 154(b) by 504 days.

This patent is subject to a terminal disclaimer.

(21) Appl. No.: 12/008,707

(22) Filed: Jan. 10, 2008

(65) Prior Publication Data

US 2008/0209042 A1     Aug. 28, 2008

Related U.S. Application Data

(63) Continuation of application No. 10/347,898, filed on Jan. 20, 2003, now Pat. No. 7,461,146.

(51) Int. Cl.
*G06F 15/173* (2006.01)
*G06F 15/167* (2006.01)

(52) U.S. Cl. ............... 709/224; 709/213; 709/223

(58) Field of Classification Search .......... 709/223–224, 709/213, 246, 217
See application file for complete search history.

(56) References Cited

U.S. PATENT DOCUMENTS

| | | | |
|---|---|---|---|
| 5,392,244 A | 2/1995 | Jacobson et al. | |
| 5,774,660 A | 6/1998 | Brendel et al. | |
| 5,774,668 A | 6/1998 | Choquier et al. | |
| 5,978,844 A | 11/1999 | Tsuchiya et al. | |
| 6,070,191 A | 5/2000 | Narendran et al. | |
| 6,108,727 A | 8/2000 | Boals et al. | |
| 6,112,257 A * | 8/2000 | Mason et al. | 710/18 |
| 6,122,681 A | 9/2000 | Aditya et al. | |
| 6,128,279 A | 10/2000 | O'Neil et al. | |
| 6,141,688 A | 10/2000 | Bi et al. | |
| 6,144,848 A | 11/2000 | Walsh et al. | |
| 6,148,414 A | 11/2000 | Brown et al. | |
| 6,173,293 B1 * | 1/2001 | Thekkath et al. | 1/1 |
| 6,185,601 B1 * | 2/2001 | Wolff | 709/203 |
| 6,189,079 B1 | 2/2001 | Micka et al. | |
| 6,195,682 B1 | 2/2001 | Ho et al. | |

(Continued)

FOREIGN PATENT DOCUMENTS

WO    WO 99/53415 A    10/1999

(Continued)

OTHER PUBLICATIONS

Baltazar, H. and Garcia, A. Build Your Own SAN (2002).

(Continued)

*Primary Examiner* — Hussein A Elchanti

(74) *Attorney, Agent, or Firm* — Hamilton, Brook, Smith & Reynolds, P.C.

(57) ABSTRACT

Systems and methods for providing an efficient partitioned resource server. In one embodiment, the partitioned resource server comprises a plurality of individual servers, and the individual servers appear to be equivalent to a client. Each of the individual servers may include a routing table that includes a reference for each resource that is maintained on the partitioned resource server. Requests from a client are processed as a function of the routing table to route the request to the individual server that maintains or has control over the resource of interest.

21 Claims, 6 Drawing Sheets

U.S. PATENT DOCUMENTS

| | | | | |
|---|---|---|---|---|
| 6,199,112 | B1 | 3/2001 | Wilson | |
| 6,212,565 | B1 | 4/2001 | Gupta | |
| 6,212,606 | B1 | 4/2001 | Dimitroff | |
| 6,226,684 | B1 | 5/2001 | Sung et al. | |
| 6,259,705 | B1* | 7/2001 | Takahashi et al. | 370/465 |
| 6,292,181 | B1 | 9/2001 | Banjerjee et al. | |
| 6,327,622 | B1* | 12/2001 | Jindal et al. | 709/228 |
| 6,341,311 | B1 | 1/2002 | Smith et al. | |
| 6,360,262 | B1 | 3/2002 | Guenthner et al. | |
| 6,421,723 | B1 | 7/2002 | Tawil | |
| 6,434,683 | B1 | 8/2002 | West et al. | |
| 6,460,083 | B1 | 10/2002 | Niwa et al. | |
| 6,473,791 | B1 | 10/2002 | Al-Ghosein et al. | |
| 6,498,791 | B2 | 12/2002 | Pickett et al. | |
| 6,598,134 | B2 | 7/2003 | Ofek et al. | |
| 6,687,731 | B1 | 2/2004 | Kavak | |
| 6,725,253 | B1 | 4/2004 | Okano et al. | |
| 6,732,171 | B2 | 5/2004 | Hayden | |
| 6,742,059 | B1 | 5/2004 | Todd et al. | |
| 6,745,241 | B1* | 6/2004 | French et al. | 709/221 |
| 6,766,348 | B1 | 7/2004 | Combs et al. | |
| 6,813,635 | B1 | 11/2004 | Jorgenson | |
| 6,850,982 | B1 | 2/2005 | Siegel | |
| 6,859,834 | B1 | 2/2005 | Arora et al. | |
| 6,880,156 | B1* | 4/2005 | Landherr et al. | 718/105 |
| 6,886,035 | B2 | 4/2005 | Wolff | |
| 6,910,150 | B2 | 6/2005 | Mashayekhi et al. | |
| 6,944,777 | B1 | 9/2005 | Belani et al. | |
| 6,950,848 | B1 | 9/2005 | Yousefi'zadeh | |
| 6,957,433 | B2 | 10/2005 | Umberger et al. | |
| 6,985,914 | B2* | 1/2006 | Venkatesh et al. | 1/1 |
| 6,985,956 | B2 | 1/2006 | Luke et al. | |
| 7,043,564 | B1 | 5/2006 | Cook et al. | |
| 7,051,050 | B2* | 5/2006 | Chen et al. | 707/679 |
| 7,076,655 | B2 | 7/2006 | Griffin et al. | |
| 7,085,829 | B2 | 8/2006 | Wu et al. | |
| 7,089,293 | B2 | 8/2006 | Grosner et al. | |
| 7,127,577 | B2 | 10/2006 | Koning et al. | |
| 7,461,146 | B2 | 12/2008 | Koning et al. | |
| 7,509,407 | B2* | 3/2009 | Miller et al. | 709/223 |
| 7,509,524 | B2* | 3/2009 | Patel et al. | 714/5 |
| 2001/0039581 | A1 | 11/2001 | Deng et al. | |
| 2002/0008693 | A1 | 1/2002 | Banerjee et al. | |
| 2002/0009079 | A1 | 1/2002 | Jungck et al. | |
| 2002/0035667 | A1 | 3/2002 | Brunning | |
| 2002/0059451 | A1 | 5/2002 | Haviv | |
| 2002/0065799 | A1 | 5/2002 | West et al. | |
| 2002/0103923 | A1* | 8/2002 | Cherian et al. | 709/235 |
| 2002/0138551 | A1 | 9/2002 | Erickson | |
| 2002/0194324 | A1 | 12/2002 | Guha | |
| 2003/0005119 | A1 | 1/2003 | Mercier et al. | |
| 2003/0074596 | A1 | 4/2003 | Mashayekhi et al. | |
| 2003/0117954 | A1 | 6/2003 | De Neve et al. | |
| 2003/0225884 | A1 | 12/2003 | Hayden | |
| 2004/0030755 | A1 | 2/2004 | Koning et al. | |
| 2004/0049564 | A1 | 3/2004 | Ng et al. | |
| 2004/0080558 | A1 | 4/2004 | Blumenau et al. | |
| 2004/0083345 | A1 | 4/2004 | Kim et al. | |
| 2004/0103104 | A1 | 5/2004 | Hara et al. | |
| 2004/0128442 | A1 | 7/2004 | Hinshaw et al. | |
| 2004/0143637 | A1 | 7/2004 | Koning et al. | |
| 2004/0143648 | A1 | 7/2004 | Koning et al. | |
| 2004/0153606 | A1 | 8/2004 | Schott | |
| 2004/0210724 | A1 | 10/2004 | Koning et al. | |
| 2005/0010618 | A1 | 1/2005 | Hayden | |
| 2005/0144199 | A2 | 6/2005 | Hayden | |
| 2005/0240628 | A1* | 10/2005 | Jiang et al. | 707/104.1 |
| 2007/0106857 | A1 | 5/2007 | Koning et al. | |

FOREIGN PATENT DOCUMENTS

| | | |
|---|---|---|
| WO | WO 01/38983 | 5/2001 |
| WO | WO 02/37943 | 5/2002 |
| WO | WO 02/44885 | 6/2002 |
| WO | WO 02/056182 | 7/2002 |

OTHER PUBLICATIONS

Druschel, P., Rice University and Rowstron, A., Microsoft Reseach, Cambridge, UK. PAST: A large-scale, persistent peer-to-peer storage utility.

Ottem, E. Getting the Most From Your Storage: How to Deploy a SAN. Gadzoox Networks, Inc. (1999).

Networking with Pyramix.

Storage Area Networking (SAN)—The Veritas Strategy. Q Associates (2000).

Rapaport, L. and Baltazar, H. Introduction to SANs: Technology, Benefits, and Applications. (Jul. 9, 2001).

Enlist Desktops to Mirror Data. Tech Target (2002).

Scheuermann P et al: "Data Partitioning and Load Balancing in Parallel Disk Systems" Techn. Rpt. A/02/96 University of Saarland. pp. 1-48.

Wei Lui et al: "Design of an I/O balancing file system on web server clusters" Parallel Processing 2000 Intern. Workshops on Aug. 21-24, 2000, Piscataway, NJ, USA, IEEE, Aug. 21, 2000, pp. 119-125.

Anderson T E et al: "Serverless Network File Systems" ACM Transactions on Computer Systems, Assoc. for Computing Machinery, New York, US, vol. 14, No. 1, pp. 41-79, Feb. 1, 1996.

Hac A et al: IEEE: "Dynamic load balancing in a distributed system using a decentralized algorithm" Int. Conf. on Distributed Computing Systems, West Berlin, Sep. 21, 1987. Conf. Proceedings vol. 7, pp. 170-177.

Hartman J H et al: "The Zebra Striped Network File System" Operating Review (SIGOPS), ACM Headquarter New York, US vol. 27, No. 5, Dec. 1, 1993, pp. 29-43.

U.S. Appl. No. 60/411,743, filed Sep. 2002, Hinshaw et al.

Office Action dated May 4, 2006 in U.S. Appl. No. 10/347,901, and subsequent reply.

Office Action dated Dec. 29, 2006 in U.S. Appl. No. 10/347,901, and subsequent reply.

Office Action dated Apr. 19, 2007 in U.S. Appl. No. 10/347,901, and subsequent reply.

Office Action dated Feb. 15, 2006 in U.S. Appl. No. 10/217,118, and subsequent reply.

Office Action dated Aug. 10, 2006 in U.S. Appl. No. 10/217,118, and subsequent reply.

Office Action dated Apr. 10, 2007 in U.S. Appl. No. 10/217,118, and subsequent reply.

Office Action dated Mar. 10, 2006 in U.S. Appl. No. 10/762,984, and subsequent reply.

Office Action dated Aug. 18, 2006 in U.S. Appl. No. 10/762,984, and subsequent reply.

Office Action dated Mar. 21, 2006 in U.S. Appl. No. 10/762,984, and subsequent pre-appeal brief.

Office Action dated Mar. 14, 2006 in U.S. Appl. No. 10/761,884, and subsequent reply.

Office Action dated Oct. 20, 2006 in U.S. Appl. No. 10/761,884, and subsequent reply.

Office Action dated May 22, 2007 in U.S. Appl. No. 10/761,884, and subsequent reply.

Office Action dated Feb. 20, 2007 in U.S. Appl. No. 10/762,985, and subsequent reply.

Office Action dated Aug. 9, 2007 in U.S. Appl. No. 10/762,985, and subsequent reply.

* cited by examiner

ADAPTIVE STORAGE BLOCK DATA DISTRIBUTION

FIELD OF THE INVENTION

The invention relates to data storage and in particular to data block storage services that store data blocks across a plurality of servers.

BACKGROUND OF THE INVENTION

As companies rely more and more on e-commerce, on line transaction processing, and databases, the amount of information that needs to be managed and stored can intimidate even the most seasoned of network managers.

While servers do a good job of storing data, their capacity is limited, and they can become a bottleneck if too many users try to access the same information. Instead, most companies rely on peripheral storage devices such as tape libraries, RAID disks, and even optical storage systems. These storage devices are effective for backing up data online and storing large amounts of information. By hanging a number of such devices off of a server, a network administrator can create a server farm that can store a substantial amount of data for the enterprise.

But as server farms increase in size, and as companies rely more heavily on data-intensive applications such as multimedia, this traditional storage model is not quite as useful. This is because access to these peripheral devices can be slow, and it might not always be possible for every user to easily and transparently access each storage device. Recently, a number of vendors have been developing Storage Area Network (SAN). SANs provide more options for network storage, including much faster access than the peripheral devices that operate as Network Attached Storage (NAS) and SANs further provide flexibility to create separate networks to handle large volumes of data.

A SAN is a high-speed special-purpose network or subnetwork that interconnects different kinds of data storage devices with associated data servers on behalf of a larger network of users. Typically, a storage area network is part of the overall network of computing resources for an enterprise. A SAN is usually clustered in close proximity to other computing resources such as IBM S/390 mainframes but may also extend to remote locations for backup and archival storage, using wide area network carrier technologies such as ATM or Synchronous Optical Networks. A SAN can use existing communication technology such as optical fiber ESCON or Fibre Channel technology.

SANs support disk mirroring, backup and restore, archival and retrieval of archived data, data migration from one storage device to another, and the sharing of data among different servers in a network. SANs can incorporate subnetworks with network-attached storage systems.

Although SANs hold much promise, they face a significant challenge. Bluntly, consumers expect a lot of their data storage systems. Specifically, consumers demand that SANs provide network type scalability, service and flexibility, while at the same time providing data access at speeds that compete with server farms. This can be quite a challenge, particularly in environments where the dynamics of client data usage vary greatly and tend to change over time. For example, the speed at which a storage system can respond to a client demand, depends at least in part on the resources available to the server that is processing the request. However, client requests for data can be bursty and can tend to request certain portions of the stored data much more frequently than some of the other data. Moreover, client requests can follow patterns where certain portions of the stored data are commonly, although not always, requested along with other portions of the stored data.

In enterprise storage systems, different techniques have been developed to deal with the fact that certain portions of the stored data are requested more frequently than other portions. Further, striping techniques have been developed to allow enterprise storage systems to form patterns of data blocks that are more efficiently read from the disk storage devices. However, these techniques are readily implemented on the typical enterprise storage system by modifying the gateway or switch to monitor client requests and control how data is stored on the underlying storage media. For storage area networks such techniques can also be employed, however they force the SAN to use a gateway or switch architecture, and this can reduce the speed at which client requests can be performed.

Accordingly, it would therefore be desirable to provide a method and system that allows storage are network to control how data is stored and managed on the systems without requiring a gateway to monitor all incoming request traffic.

SUMMARY OF THE INVENTION

The systems and methods described herein include systems for providing a block level data storage service. More particularly, the systems and methods of the invention provide a block level data storage service that may be employed with a server system that partitions the block storage service across a plurality of equivalent servers. A system of equivalents severs will be understood to encompass, but not be limited to, systems comprised of a plurality of equivalent servers wherein each of the equivalent servers presents a similar interface to a client and each equivalent server presents the same response to the same request from the client. The systems and methods described herein may be applied to different applications and are not limited to any particular application, however, for the purpose of clarity, the systems and methods described herein will be described with reference to a block level data storage application wherein a plurality of data blocks are stored on a block data volume that is partitioned across a plurality of storage devices with different portions of the data volume being associated with different equivalent servers on the system.

As further described herein, the server system optionally employs an adaptive storage block data distribution process for distributing blocks of data across the different partitions of the data volume. To this end, each equivalent server includes a routing table, a data mover process and a request monitor process. The request monitor process is capable of monitoring requests made to the server from the one or more clients that are accessing the system. The request may be associated with data blocks stored on a partition or somewhere on the volume. The request monitor can monitor the different requests that clients make to the associated server. Additionally, the request monitor may communicate with other request monitor processes running on the different equivalent servers on the system. In this way, the request monitor can generate a global view of the requests being forwarded by clients to the partitioned block data storage system. By sharing this information, each equivalent server may, through its associated request monitor process, develop a global understanding of the requests being serviced by the block data storage system.

Once this global understanding of the request traffic being handled by the block data storage system is developed, each equivalent server may then employ its data mover process to move data blocks, or the responsibility for different data blocks, from one server to another different server. In one embodiment, each data mover process employs the global request data to determine distributions of data blocks that provide for more efficient service to a requesting client, more efficient allocation of resources, or in some other way improves the performance, reliability, or some other characteristic of the block data storage system.

In one particular embodiment, each data mover process is capable of communicating with another data mover process for the purpose of allowing the data mover processes of different servers to communicate when data blocks are being moved from one server to another different server. For example, in one embodiment, for the purpose of increasing reliability of data transfer, the data mover processes on the different equivalent servers can employ a transaction mechanism that monitors the transfer of data blocks from one server to the other and verifies when the block data transfer is complete and whether or not the entire transfer was successful.

To maintain an understanding of the location of the different data blocks across the different partitions of a volume and across the different volumes maintained by the data block storage system, each equivalent server maintains a routing table. To this end, each equivalent server includes a routing table process that tracks the different data blocks being stored on the block data storage system and the particular equivalent server that is responsible for each data block. In one embodiment, the routing table processes of the equivalent servers are capable of communicating with each other for the purpose of having each equivalent server maintain a routing table that provides a complete, system-wide database of the different data blocks maintained by the block data storage system and the equivalent servers that are associated with these different data blocks.

In accordance with the invention as embodied and broadly described herein, the invention provides, inter alia, methods, computer program products, and systems for allowing a plurality of servers to provide coherent support for incoming requests for services or resources. To this end, the systems and methods described herein distribute, organize and maintain resources across a plurality of services. In one preferred embodiment, the servers are truly equivalent in that they each can respond to an incoming request in the same manner. Thus, each server appears equivalent to clients that are requesting access to resources maintained on the system.

In one embodiment, the routing tables also store group membership information indicating the groups to which a server is a member. The routing table may be updated as necessary to reflect changes in group membership due to additions, removals, or temporary unavailability of the various servers that make up the group. When changes have propagated through the server group, all relevant routing tables at each server will contain identical information.

When a server receives a resource request, it uses the relevant routing table to identify which group member should actually hold the resource object or a part of the resource object. The request may then be serviced by laterally accessing the desired data object from the correct server without making expensive query-response transactions over the network.

Further features and advantages of the invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The systems and methods described herein include systems for organizing and managing resources that have been distributed over a plurality of servers on a data network. More particularly, the systems and methods described herein include systems and methods for providing more efficient operation of a partitioned service. In particular, the systems and methods described herein include systems and methods for managing the allocation of data blocks across a partitioned volume of storage. Although the systems and methods described herein will be largely directed to storage devices and applications, it will be understood by those of skill in the art that the invention may be applied to other applications, including distributed file systems, systems for supporting application service providers and other applications. Moreover, it will be understood by those of ordinary skill in the art that the systems and methods described herein are merely exemplary of the kinds of systems and methods that may be achieved through the invention and that these exemplary embodiments may be modified, supplemented and amended as appropriate for the application at hand.

Figure 1:
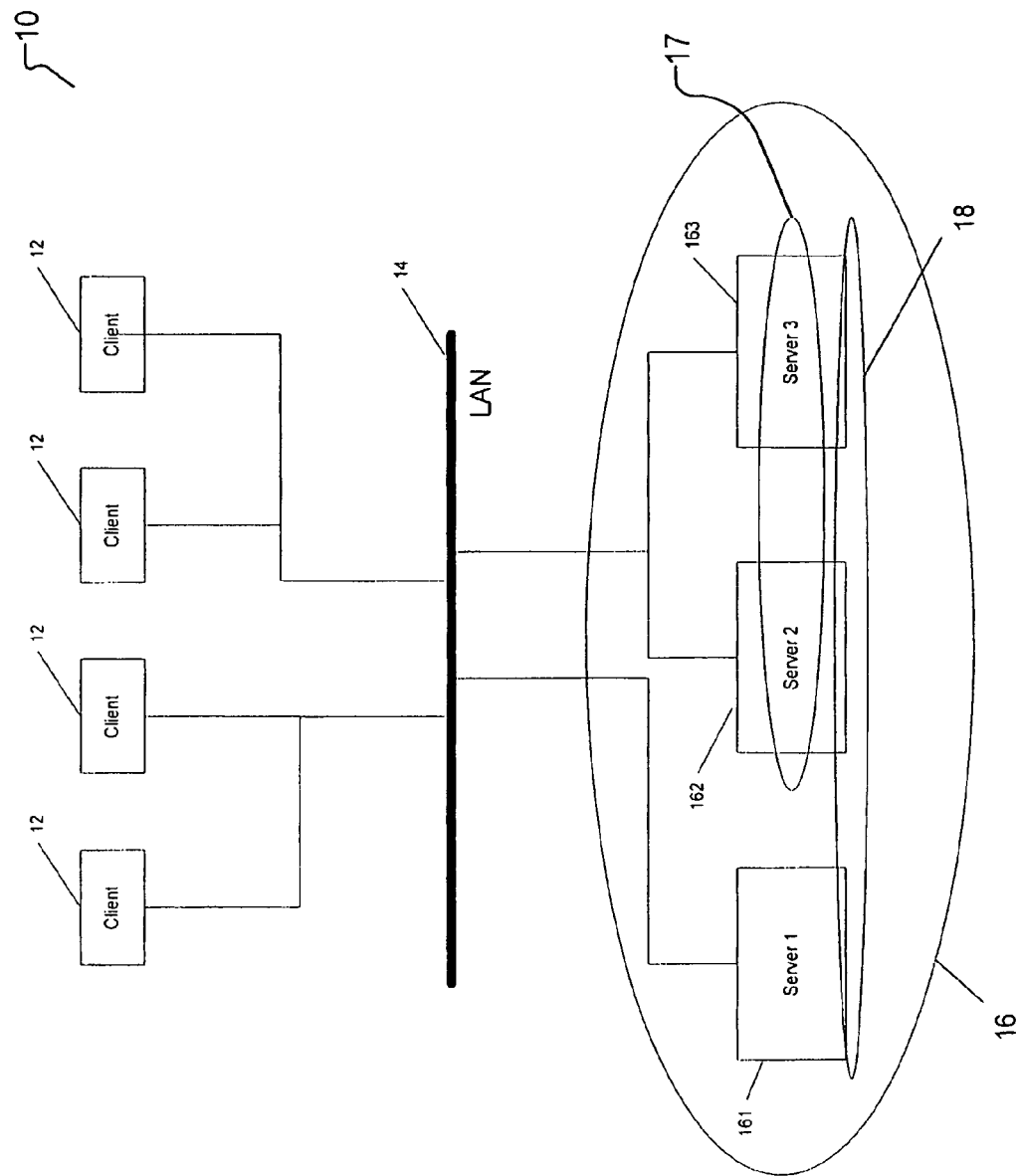
FIG. 1 is a schematic diagram of a client-server architecture with servers organized in a server group.

Referring first to FIG. 1 one embodiment of a system 10 according to the invention is depicted. As show in FIG. 1, one or several clients 12 are connected, for example via a network 14, such as the Internet, an intranet, a WAN or LAN, or by direct connection, to servers 161, 162, and 163 that are part of a server group 16.

The client 12 can be any suitable computer system such as a PC workstation, a handheld computing device, a wireless communication device, or any other such device, equipped with a network client capable of accessing and interacting with the server group 16 to exchange information with the server group 16. The network client may be a any client that allows the user to exchange data with the server. Optionally, the client 12 and the server group 16 rely on an unsecured communication path for accessing services at the remote server group 16. To add security to such a communication path, the client and the server can employ a security group system, such as any of the conventional security systems that have been developed to provide to the remote user a secured channel for transmitting data over a network. One such system is the Netscape secured socket layer (SSL) security mechanism that provides to a remote user a trusted path between a conventional web browser program and a web server.

Each server 161, 162 and 163 may comprise a commercially available server platform, such as a Sun Sparc™ system running a version of the Unix operating system.

Each server 161, 162 and 163 may also include other software components that extend their operation to accomplish the transactions described herein, and the architecture of the servers 161, 162 and 163 may vary according to the application. For example, each server may have built-in extensions, typically referred to as modules, to allow the servers to perform the operations hereinafter, or servers may have access to a directory of executable files, each of which may be employed for performing the operations, or parts of the operations described below. Further, in other embodiments, the servers 161, 162 and 163 may employ a software architecture that builds certain of the processes described below into the server's operating system, into a device driver, or into a software process that operates on a peripheral device, such as a tape library, a RAID storage system or some other device. In any case, it will be understood by those of ordinary skill in the art that the systems and methods described herein may be realized through many different embodiments, and practices, and that the particular embodiment and practice employed will vary as a function of the application of interest and all these embodiments and practices fall within the scope hereof.

In such an arrangement, the client 12 will contact one of the servers, for example server 161, in the group 16 to access a resource, such as a data block, page, file, database, application, or other resource. The contacted server 161 itself may not hold or have control over the requested resource. To address this, the server group 16 is configured to make the partitioned resources available to the client 12. For illustration, the diagram shows two resources, one resource 18 that is partitioned over all three servers, servers 161, 162, 163, and another resource 17 that is partitioned over two of the three servers. In the exemplary application of the server group 16 being a block data storage system, each resource 18 and 17 may be a partitioned block data volume. In the embodiment of FIG. 1, the server group 16 therefore provides a block data storage service that may operate as a storage area network (SAN) comprised of a plurality of equivalent servers, servers 161, 162 and 163. Each of the servers 161, 162 and 163 may support one or more portions of the partitioned block data volumes 18 and 17. In the depicted system 10, there are two data volumes and three servers, however there is no specific limit on the number of servers. Similarly, there is no specific limit on the number of resources or data volumes. Moreover, each data volume may be contained entirely on a single server, or it may be partitioned over several servers, either all of the servers in the server group, or a subset of the server group. In practice, there may of course be limits due to implementation considerations, for example the amount of memory available in the servers 161, 162 and 163 or the computational limitations of the servers 161, 162 and 163. Moreover, the grouping itself, i.e., deciding which servers will comprise a group 16, may in one practice comprise an administrative decision. In a typical scenario, a group might at first contain only a few servers, perhaps only one. The system administrator would add servers to a group as needed to obtain the level of service required. Increasing servers creates more space (memory, disk storage) for resources that are stored, more CPU processing capacity to act on the client requests, and more network capacity (network interfaces) to carry the requests and responses from and to the clients. It will be appreciated by those of skill in the art that the systems described herein are readily scaled to address increased client demands by adding additional servers into the group 16.

Figure 2:
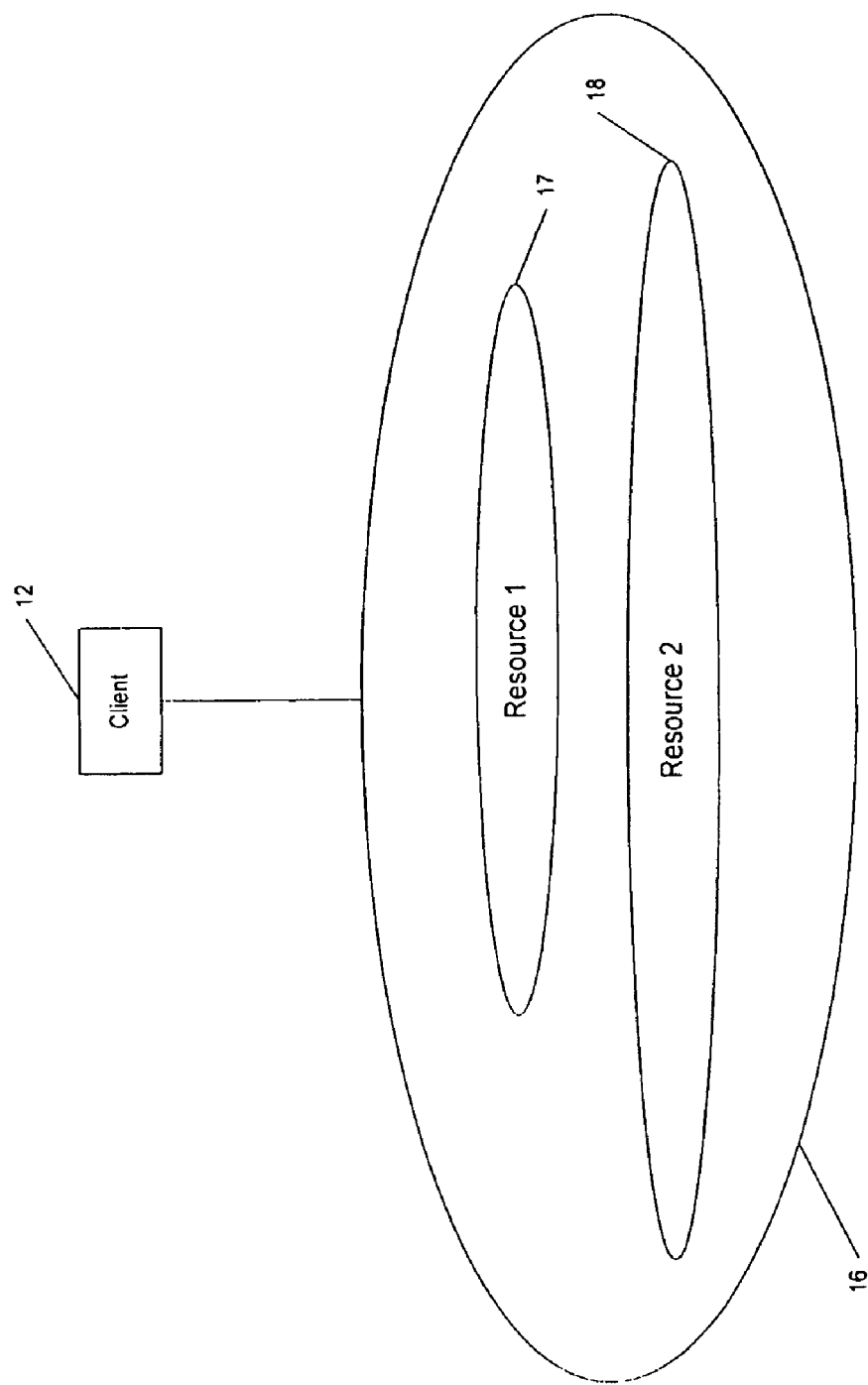
FIG. 2 is a schematic diagram of server group as seen by a client.

Referring now to FIG. 2, a client 12 connecting to a server 161 (FIG. 1) will see the server group 16 as if the group were a single server. The client 12 is not aware that the server group 16 is constructed out of a potentially large number of servers 161, 162, 163, nor is it aware of the partitioning of the block data volumes 17, 18 over the several servers 161, 162, 163. As a result, the number of servers and the manner in which resources are partitioned among the servers may be changed without affecting the network environment seen by the client 12.

Figure 3:
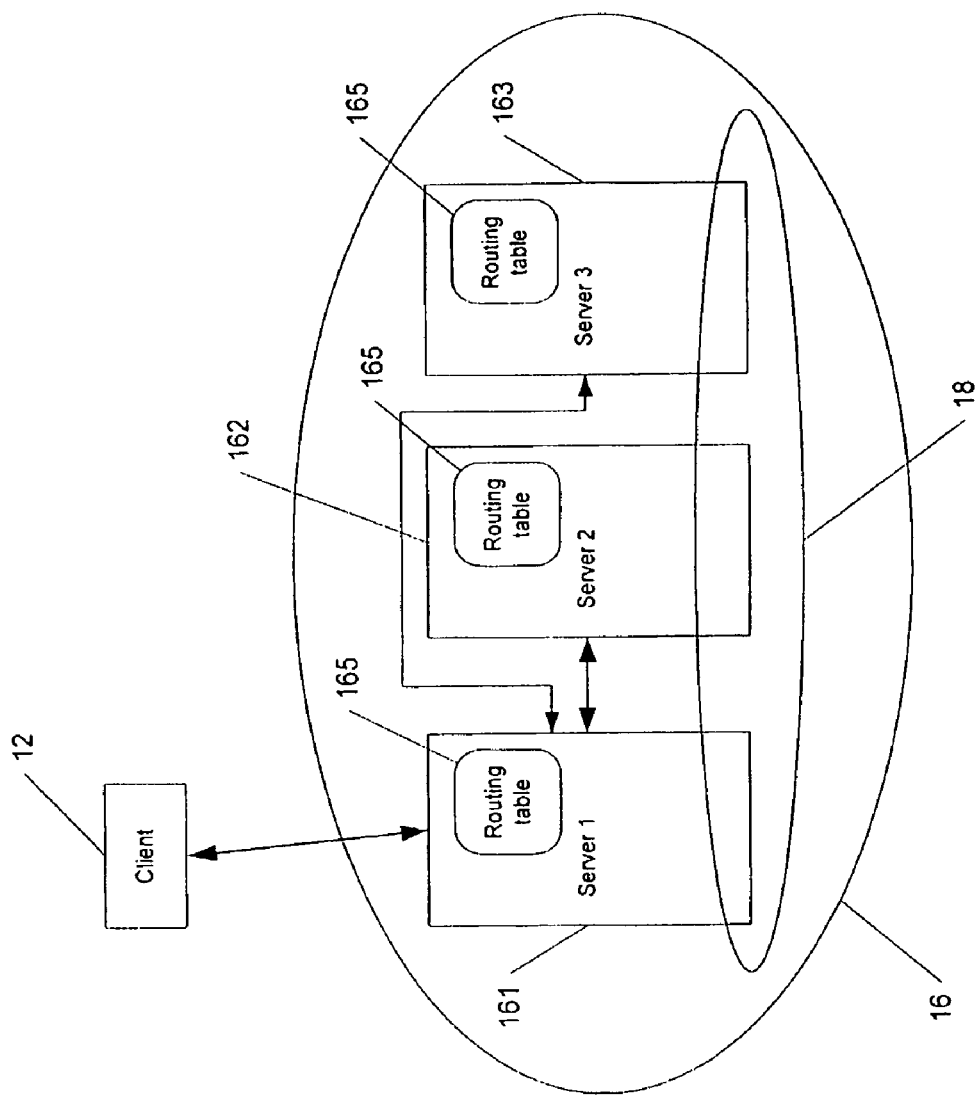
FIG. 3 shows details of the information flow between the client and the servers of a group.

Referring now to FIG. 3, in the partitioned server group 16, any volume may be spread over any number of servers within the group 16. As seen in FIGS. 1 and 2, one volume 17 (Resource 1) may be spread over servers 162, 163, whereas another volume 18 (Resource 2) may be spread over servers 161, 162, 163. Advantageously, the respective volumes are arranged in fixed-size groups of blocks, also referred to as "pages," wherein an exemplary page contains 8192 blocks. Other suitable page sizes may be employed. In an exemplary embodiment, each server in the group 16 contains a routing table 165 for each volume, with the routing table 165 identifying the server on which a specific page of a specific volume can be found. For example, when the server 161 receives a request from a client 12 for partitioned volume 18, block 93847, the server 161 calculates the page number (page 11 in this example for the page size of 8192) by dividing the requested block number by the page size and looks up in the routing table 165 the number of the server that contains page 11. If server 163 contains page 11, the request is forwarded to server 163, which reads the data and returns the data to the server 161. Server 161 then send the requested data to the client 12. In other words, the response is always returned to the client 12 via the same server 161 that received the request from the client 12.

It is transparent to the client 12 to which server 161, 162, 163 it is connected. Instead, the client only sees the servers in the server group 16 and requests the resources of the server group 16. It should be noted here that the routing of client requests is done separately for each request. This allows portions of the resource to exist at different servers. It also allows resources, or portions thereof, to be moved while the client is connected to the server group 16—if that is done, the routing tables 165 are updated as necessary and subsequent client requests will be forwarded to the server now responsible for handling that request. At least within a resource 17 or 18, the routing tables 165 are identical. The described invention is different from a "redirect" mechanism, wherein a server determines that it is unable to handle requests from a client, and redirects the client to the server that can do so. The client then establishes a new connection to another server. Since establishing a connection is relatively inefficient, the redirect mechanism is ill-suited for handling frequent requests.

Figure 4:
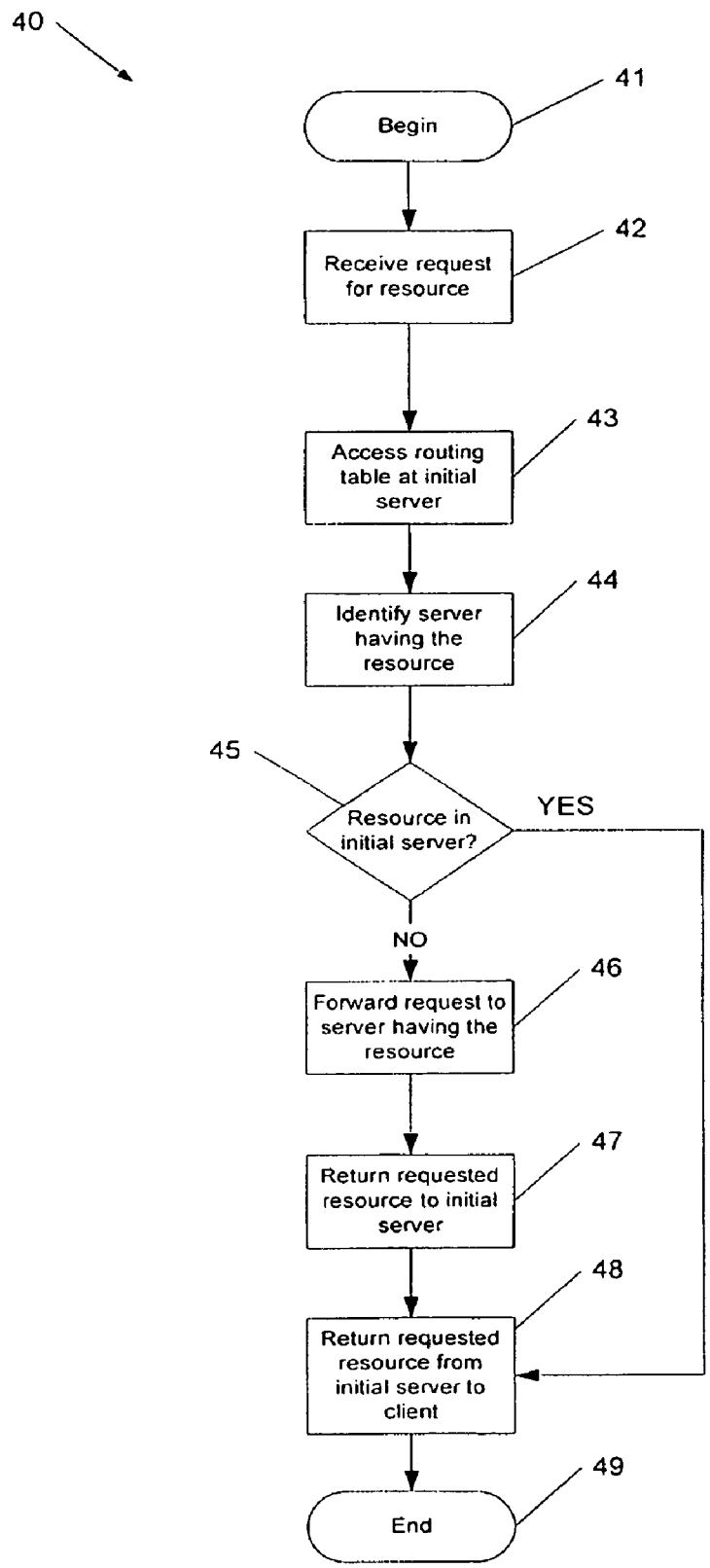
FIG. 4 is a process flow diagram for retrieving resources in a partitioned resource environment.

FIG. 4 depicts an exemplary process flow 40 for handling client requests in a partitioned server environment. The process 40 begins 41 by receiving a request for a resource, such as a file or blocks of a file, step 42. The server will consult a routing table, step 43, to determine which server actually holds the specific piece of data requested by the client, step 44. The process checks in step 45 if the requested resource is present at the initial server that received the request from the client. If the requested resource is present at the initial server, the initial server returns the requested resource to the client, step 48, and the process 40 terminates, step 49. Conversely, if the requested resource is not present at the initial server, the request is then forwarded to the server that holds the requested resource, step 46, which returns the requested resource to the initial server, step 47. The process then goes to step 48 as before, to have the initial server forward the requested resource to the client, and the process 40 terminates, step 49.

The resources spread over the several servers can be directories, individual files within a directory, or even blocks within a file. Other partitioned services could be contemplated. For example, it may be possible to partition a database in an analogous fashion or to provide a distributed file system, or a distributed or partitioned server that supports applications being delivered over the Internet. In general, the approach can be applied to any service where a client request can be interpreted as a request for a piece of the total resource, and operations on the pieces do not require global coordination among all the pieces.

Figure 5:
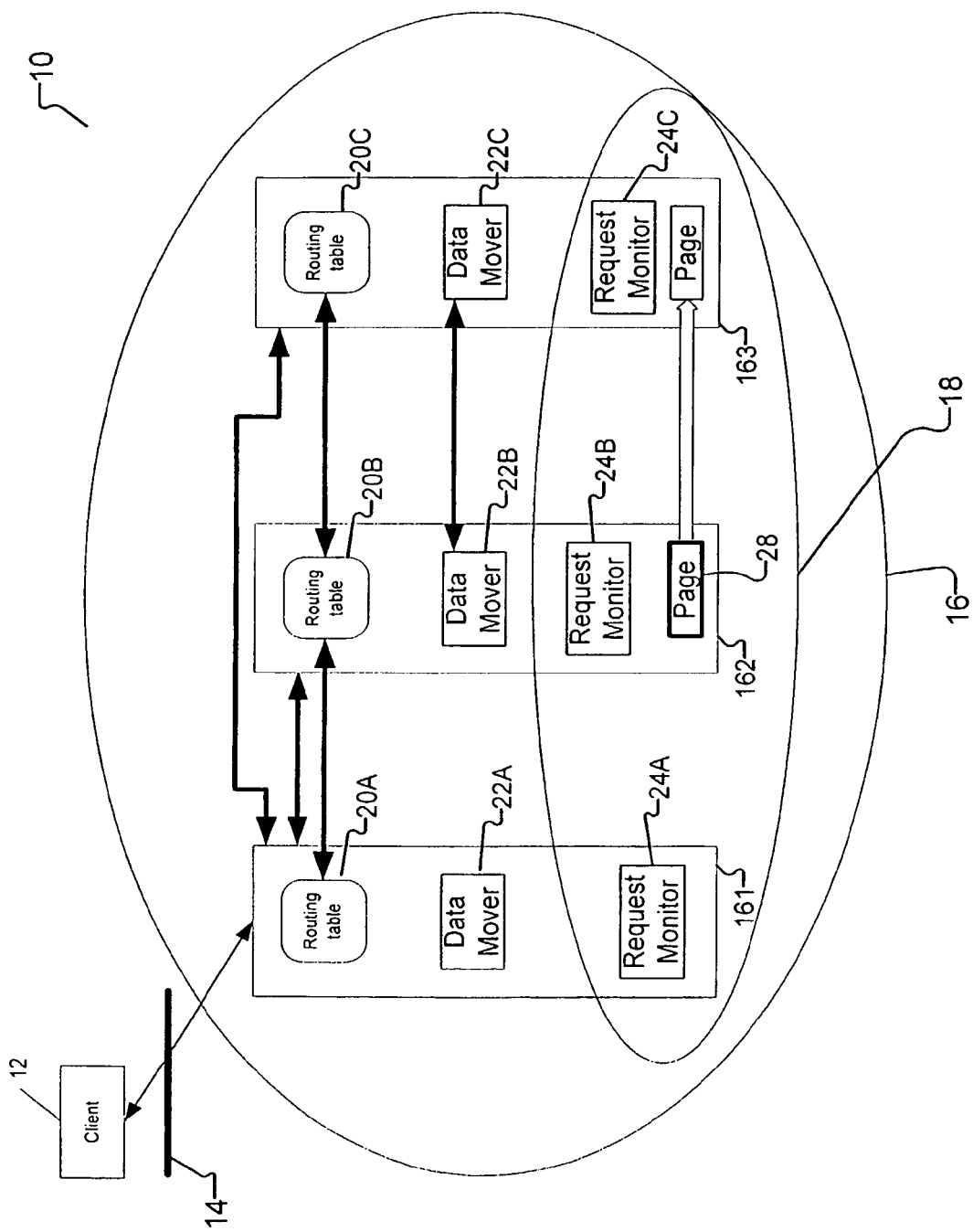
FIG. 5 depicts in more detail and as a functional block diagram one embodiment of a system according to the invention.

Turning now to FIG. 5, one particular embodiment of a block data service system 10 is depicted. Specifically, FIG. 5 depicts the system 10 wherein the client 12 communicates with the server group 16. The server block includes three servers, server 161, 162 and 163. Each server includes a routing table depicted as routing tables 20A, 20B, and 20C. Additionally, each server includes a data mover process 22A, 22B, and 22C respectively. In addition to the routing tables and data mover processes, each of the equivalent servers 161, 162, and 163 are shown in FIG. 5 as including a request monitor process, 24A, 24B, and 24C respectively. Further, and for the purpose of illustration only, the FIG. 5 presents an arrangement of data blocks as a page of data 28 that may be transferred from one server, 162, to another server, 163. It will be understood that although FIG. 5 depicts the data blocks as organized into a data page, this is only one particular practice and other practices may move individual data blocks between the different servers. Moreover, different kinds of organizations of data blocks, such as files, directories, and other organizations of data may be employed and the systems and methods described herein are not to be limited to any particular embodiment such as an embodiment that moves data blocks as pages from one server to another.

As shown in FIG. 5, each of the equivalent servers 161, 162, and 163 may include a routing table 20A, 20B, and 20C respectively. As shown in FIG. 5, each of the routing tables 20A, 20B, and 20C are capable of communicating with each other for the purposes of sharing information. As described above, the routing tables can track which of the individual equivalent servers is responsible for a particular resource maintained by the server group 16. In the embodiment shown in FIG. 5, the server group 16 may be a storage area network (SAN) wherein each of the equivalent servers 161, 162, and 163 has an individual IP address that may be employed by a client 12 for accessing that particular equivalent server on the SAN. As further described above, each of the equivalent servers 161, 162, and 163 is capable of providing the same response to the same request from a client 12. To that end, the routing tables of the individual equivalent 161, 162, and 163 coordinate with each other to provide a global database of the different resources (e.g., in this exemplary embodiment, data blocks, pages, or other organizations of data blocks) and the individual equivalent servers that are responsible for those respective data: blocks, pages, files, or other storage elements.

Figure 6:
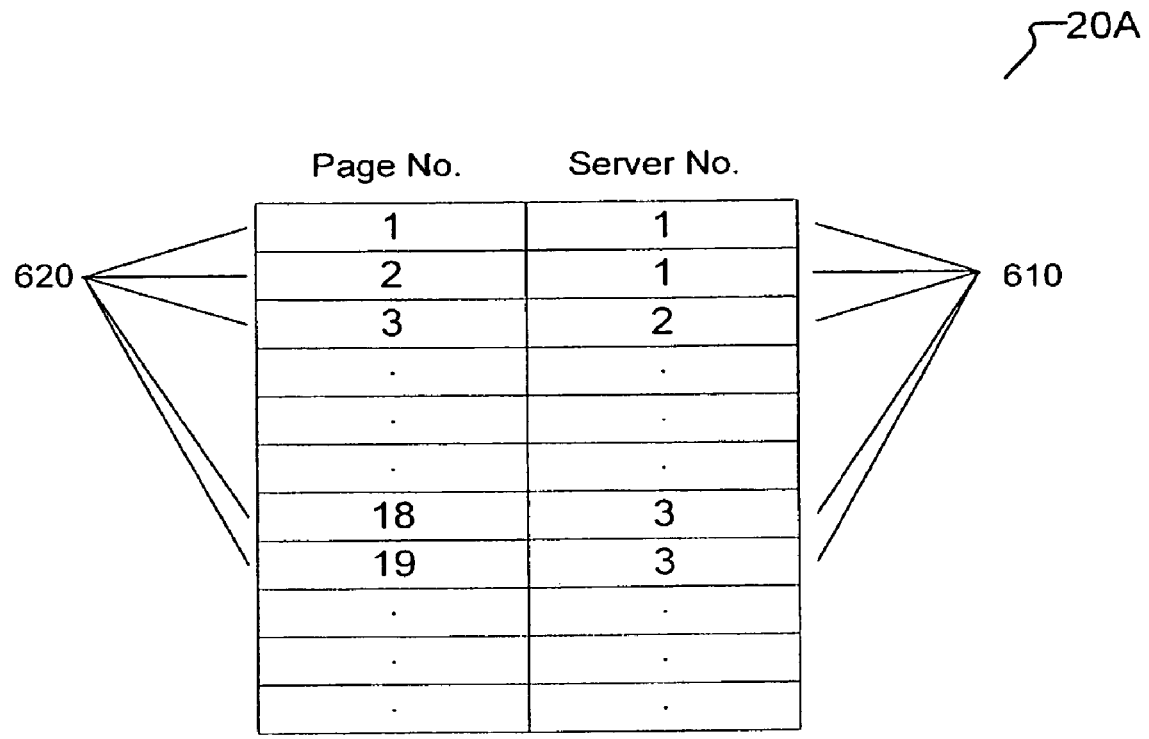
FIG. 6 depicts one example of a routing table.

FIG. 6 depicts one example of a routing table 20A and the information stored therein. As depicted in FIG. 6, each routing table includes a server number 610 for each of the equivalent servers 161, 162 and 163 that support the partitioned data block storage service. Additionally, each of the routing tables identifies those pages 620 associated with each of the respective equivalent servers.

As further shown in FIG. 5, the data mover process 22B employs the information stored within the routing table 20B for the purpose of determining whether a more efficient or reliable arrangement of data blocks may be achieved. To this end, the data mover process 20B comprises a computer program that applies an algorithm to the data collected by the request monitors 24A, 24B, and 24C. The data mover process applies an algorithm that reviews the current distribution of data blocks and considers the current client demand for these data blocks when determining whether a more efficient allocation of data blocks is available. To this end, the data mover process 22B also is capable of communicating with the request monitor process 24B.

The request monitor processes 24A, 24B, and 24C each observer the request patterns arriving at their respective equivalent servers to determine to determine whether patterns or requests from clients 12 are being forwarded to the SAN and whether these patterns may allow for more efficient or reliable partitioning of data blocks. In one embodiment, the request monitor process 24A, 24B, and 24C merely monitor client requests coming to their respective equivalent servers. In one embodiment, the request monitor processes each build a table representative of the different requests that have been seen by the individual request monitor processes. Each of the request monitor processes 24A, 24B, and 24C are capable of communicating between themselves for the purpose of building a global database of requests seen by each of the equivalent servers. Accordingly, in this embodiment each of the request monitor processes is capable of integrating request data from each of the equivalent servers 161, 162 and 163 in generating a global request database representative of the request traffic seen by the entire block data storage system 16.

In one embodiment, this global request database is made available to the data mover processes 22A, 22B, and 22C for their use in determining whether a more efficient or reliable partitioning of data blocks is available. However, in alternate embodiments, each of the request mover processes 24A, 24B, and 24C include pattern identification processes capable of reviewing the request database to determine whether patterns of request exist within the database. For example, in one embodiment, the request monitor process 24B is capable of reviewing the global database of requests to determine whether there is a pattern where a plurality of different data blocks are typically requested either together or in sequence. If such a pattern is identified, then the pattern may be flagged and made available to any of the data mover processes 22A, 22B, or 22C for their use in determining whether data blocks could be striped across a plurality of servers to provide for more efficient servicing of client requests. Additionally, in other embodiments, the request monitor processes may be able to identify blocks of data that are typically requested together and which are being requested at a frequency that is above a pre-identified or predetermined threshold. This allows the request monitors 24A, 24B, and 24C to identify "hot blocks" that may exist within the partitioned volume. In other embodiments, the request monitor processes 24A, 24B and 24C may be capable of identifying other patterns that occur within the requests being forwarded from clients to the block data storage system 16.

Returning again to FIG. 5, an example of a redistribution of partitioned data blocks is depicted. Specifically, FIG. 5 shows any example wherein the data mover process 22B and the data mover process 22C coordinate their activities for the purposes of moving a page of data 28 from the equivalent server 162 to the equivalent server 163. In this embodiment, a page of data is being moved from one server to the next. As those of ordinary skill in the art will understand, a page of data is typically an organization of data blocks that groups together a plurality of data blocks such as 2,000 to typically 16,000 data blocks and provides a header such that the page is identified as a separate unit of storage on the partitioned block data volume 18. Accordingly, in this embodiment, the request monitor 24B may have determined that the page 28 is requested with sufficient frequency as to be deemed a hot block. It may further have determined that the equivalent server 162 is resource constrained in comparison to equivalent server 163. Accordingly, the equivalent server 163 may have the available resources for servicing requests from client 12 for page 28 more quickly than equivalent server 162 could do. As such, the data mover process 22B and data mover process 22C may operate together to transfer the page 28 from equivalent server 162 to equivalent server 163.

In one embodiment, the data mover process merely transfers page 28 from the storage device of equivalent server 162 to the storage device of equivalent server 163 and then updates the associated routing tables with this update being communicated across the plurality of routing tables 20A, 20B, and 20C within the block data storage system 16. However, in other embodiments, the data mover processes 22B and 22C may employ a transaction mechanism process that monitors the transfer of page 28 from the equivalent server 162 to the equivalent server 163 and determines when the transaction is complete and optionally whether the page 28 was transferred without error, and at that point updates the associated routing tables 20A, 20B, and 20C. The transaction employed by the data mover processes 22B and 22C may be any of the conventional transfer mechanism processes such as those commonly employed with a distributed file system.

Although FIG. 1 depicts the system as an assembly of functional block elements including a group of server systems, it will be apparent to one of ordinary skill in the art that the systems of the invention may be realized as computer programs or portions of computer programs that are capable of running on the servers to thereby configure the servers as systems according to the invention. Moreover, although FIG. 1 depicts the group 16 as a local collection of servers, it will be apparent to those or ordinary skill in the art that this is only one embodiment, and that the invention may comprise a collection or group of servers that includes server that are physically remote from each other.

As discussed above, in certain embodiments, the systems of the invention may be realized as software components operating on a conventional data processing system such as a Unix workstation. In such embodiments, the system can be implemented as a C language computer program, or a computer program written in any high level language including C++, FORTRAN, Java or BASIC. General techniques for such high level programming are known, and set forth in, for example, Stephen G. Kochan, *Programming in C*, Hayden Publishing (1983).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A system comprising:
    a plurality of equivalent servers each being responsible for serving a portion of stored data blocks in response to client requests for access to the data blocks;
    each of said plurality of equivalent servers having a respective data mover process capable of communicating with another respective data mover process on another server of said plurality of equivalent servers, for coordinating movement of data blocks between the plurality of equivalent servers;
    each of said plurality of equivalent servers also having a respective request monitor process communicating with another respective request monitor process on another server of said plurality of equivalent servers;
    each of said respective request monitor process monitoring client requests to its respective server and communicating with the other respective request monitor processes on the other equivalent servers to maintain global request information for the plurality of equivalent servers;
    said global request information identifying patterns in the client requests made to the plurality of equivalent servers collectively; and
    each of said data mover processes reallocating the blocks of data of the identified patterns from one server to another server of the plurality of equivalent servers based on operational characteristics of the plurality of equivalent servers and the identified patterns.

2. A system according to claim 1, wherein the data mover process includes an adaptive moving algorithm for responding to an operational characteristic of the plurality of servers and for identifying a reallocation of block across the plurality of servers.

3. A system according to claim 1, wherein the request monitor process determines a number of requests received by a server to determine a measure of request load carried by the server.

4. A system according to claim 1, wherein the request monitor process measures parameters selected from the group consisting of a number of clients accessing a data volume, a number of I/O requests, and a measure of available storage.

5. A system according to claim 1, wherein the request monitor process identifies whether a group of blocks are accessed together at a frequency above a hot block criterion.

6. A system according to claim 1, wherein the data mover process operates on data generated by the request monitor process to determine a data block to move to a selected server for improving performance.

7. A system according to claim 1, wherein the data mover process applies an adaptive block distribution algorithm to data generated by the request monitor process.

8. A system according to claim 1, wherein the data mover process includes a data striping algorithm for striping selected data blocks across a plurality of servers.

9. A system according to claim 1, wherein the data mover process includes a transaction process for monitoring a transfer of data blocks between servers.

10. A system according to claim 9, wherein the transaction process includes an error log process for logging an error detected during the transfer of data blocks.

11. A system according to claim 1, wherein the request monitor monitors requests made of two or more data volumes.

12. A system according to claim 1, wherein the data mover process moves data blocks associated with two or more data volumes.

13. A process for providing block level data storage, comprising:
    providing a plurality of equivalent servers each being responsible for serving a portion of stored data blocks in response to client requests for access to the stored data blocks each monitoring client requests received by a respective equivalent server;

each of said plurality of equivalent servers having a respective request monitor process for monitoring client requests and for communicating with a request monitor process on another equivalent server;

moving data blocks between the plurality of equivalent servers; and each of said respective request monitor processes further (a) monitoring client requests to its respective equivalent server and (b) communicating with other respective request monitor processes in the other equivalent servers to maintain global client request information for the plurality of equivalent servers;

analyzing said global client request information to identify patterns in the client requests made to the plurality of equivalent servers; and wherein the step of moving data blocks between the plurality of equivalent servers further moves the blocks of data from one equivalent server to another equivalent server based on operational characteristics of the plurality of equivalent servers and the identified patterns.

14. The process of claim 13, wherein
moving data blocks includes applying an adaptive algorithm for responding to an operational characteristic of the plurality of servers and for identifying a reallocation of block across the plurality of servers.

15. The process of claim 13, wherein
monitoring requests includes determining a number of requests received by a server to determine a measure of request load carried by the server.

16. The process of claim 13, wherein
monitoring requests includes measuring parameters selected from the group consisting of a number of clients accessing a data volume, a number of I/O requests, and a measure of available storage.

17. The process according to claim 13, wherein
request monitoring includes identifying whether a group of blocks are accessed together at a frequency above a hot block criterion.

18. The process according to claim 13, wherein
data moving includes striping selected data blocks across a plurality of servers.

19. The process according to claim 13, wherein
data moving includes monitoring a transfer of data blocks between servers.

20. The process according to claim 19, further including
generating an error log for logging an error detected during the transfer of data blocks.

21. The process according to claim 13, wherein
monitoring requests includes monitoring requests made of two or more data volumes.

* * * * *